UNITED STATES PATENT OFFICE.

JAMES L. RAKE, OF READING, PENNSYLVANIA, AND CLIFFORD RICHARDSON, OF NEW YORK, N. Y., ASSIGNORS TO THE BARBER ASPHALT PAVING COMPANY, OF PHILADELPHIA, PENNSYLVANIA, A CORPORATION OF WEST VIRGINIA.

MANUFACTURE OF BITUMINOUS CONCRETE.

No. 875,288.  Specification of Letters Patent.  Patented Dec. 31, 1907.

Application filed December 19, 1906. Serial No. 348,643.

*To all whom it may concern:*

Be it known that we, JAMES L. RAKE, residing at Reading, in the county of Berks and State of Pennsylvania, and CLIFFORD RICHARDSON, residing at New York, in the county of New York and State of New York, have invented certain new and useful Improvements in the Manufacture of Bituminous Concrete, whereof the following is a specification.

In manufacturing a bituminous concrete for paving or other purposes it is customary to employ a mineral aggregate of crushed stone containing various sizes of stone running from one or two inches in diameter down to dust, and preferably so graded and proportioned as to produce a dense mixture. This aggregate is heated to the proper temperature and intimately mixed with a bituminous cement made usually either of asphalt or coal tar, and is then ready for use. In order that the mineral aggregate may be properly mixed and associated with the bituminous cement, it is heated before mixing with the cement usually to a temperature of about 350° F. At this temperature its contact with the bituminous cement does not chill or otherwise alter the consistency of the cement, nor on the other hand is it so hot as to burn or unduly oxidize the cement. The maintenance of the temperature of the mineral aggregate at the proper point is a critical operation, for if the stone be too cold it chills the bituminous cement and does not properly associate with it, and if it is too hot it burns the cement and renders it an imperfect binding material.

Heretofore, the method usually employed in the manufacture of bituminous concrete has been to feed the entire run of stone into a single heater in which the attempt is made to bring the entire mass to the desired temperature. The mass of heated stone is then run through a sectional grading screen by which it is separated into sizes, and discharged into several bins each containing but a single size of the hot stone, sand or dust. From these hot bins the different sizes of the material are drawn off in predetermined proportions for the production of a mixture of the required density, and combined in a mixer with the proper quantity of the bituminous cement. After the mixing operation the material is ready for use. We have discovered that this process is faulty by reason of the fact that it relies upon a single heating operation to raise a mixture of differing sizes of stone sand and dust to the same temperature. If such a mixture as a crusher run of stone containing all sizes from say an inch and one-half in diameter to dust, is passed through a heater of any of the customary types, the larger sizes of the stone absorb heat much more rapidly than do the smaller sizes, and the sand and dust. This appears to be due to the fact that there is considerable segregation in any rotary heater and the large stone when thus segregated admits the flames and heated air into its interstices in such a way as to secure rapid heating while the sand and dust are so compact as not to admit the heated air and flame into their interstices, and as a result are much more slow in absorbing the requisite degree of heat. Consequently, when the method is followed of heating all of the mineral aggregate together, the effort to bring the fines to the necessary temperature of say 350° results in overheating the larger stone so that when the mixture is combined with the bituminous cement, the larger pieces being at a temperature higher than the desired critical temperature burn the cement destroying its vitality and rendering it an improper cementing material.

According to our invention, we subdivide the aggregate before heating into at least two sizes, one comprising the larger material and the other the smaller material, and then heat these two sizes in separate heating apparatus, each of which is so fired and so run as to bring the material fed to it to the proper temperature. By this means we are able to secure an even heating and proper temperature for the entire mineral aggregate, no part being either too hot or too cold. For example, if the aggregate employed be of a maximum size of one inch, we subdivide it initially and before heating into two parts one comprising all of the particles larger than one-tenth of an inch, that is to say, all of the particles larger than sand, and the other comprising all of the smaller particles, and feed these two grades into separate heaters of any of the usual types, and separately raise each to precisely the required temperature. For this purpose, the heater which receives the fine material will be more strongly fired or the material will be held therein for a longer time, or both, as compared with the heater in which the larger material is received. After being thus heated the material may be further subdivided as required for the purpose of properly grading the mixture, or, if such refinement of grading is not desired the mixture may be made by combining in proper proportions the two or more sizes of heated materials thus received from the separate heaters.

When thus combined the bituminous cementing material is added to the graded aggregate while still at the proper temperature and the mixture completed and delivered for use.

It will be understood that we do not confine ourselves to the theory which we have propounded as to the reason for the difficulty which is experienced in heating the fine material.

Our invention is not based upon any theoretical considerations, but upon the result of experience which has shown the practical impossibility of properly heating the large and small materials together in the same heater without unintentionally either overheating the stone or underheating the sand. This difficulty we have overcome by the process which we have invented and described.

We claim:—

1. The process of manufacturing a bituminous concrete which consists in subdividing the mineral aggregate into a plurality of sizes, heating each of these sizes in a separate heater until they are each brought to the required temperature, and then combining the said sizes and adding bituminous cement to them while the mass still maintains its proper temperature throughout.

2. The process of manufacturing a bituminous concrete which consists in subdividing the mineral aggregate into a plurality of sizes, heating each of these sizes in a separate heater until they are each brought to the required temperature, further subdividing and proportioning the aggregate, and then combining the said sizes and adding the bituminous cement to them while the mass still maintains its proper temperature throughout.

In testimony whereof, we have hereunto signed our names, in the presence of two subscribing witnesses.

JAMES L. RAKE.
CLIFFORD RICHARDSON.

Witnesses as to James L. Rake:
 FRANK SEAMANS,
 JAMES H. BELL.
Witnesses as to Clifford Richardson:
 W. P. ENNIS,
 CHARLES T. BRYAN.